United States Patent [19]

Kutowy et al.

[11] Patent Number: 4,496,502
[45] Date of Patent: Jan. 29, 1985

[54] METHOD OF GELLING A GELATION SHRINKABLE, POLYMER CASTING SOLUTION

[75] Inventors: Oleh Kutowy, North Gover; William L. Thayer; Srinivasa Sourirajan, both of Ottawa, all of Canada

[73] Assignee: Canadian Patents & Development Limited, Ottawa, Canada

[21] Appl. No.: 465,548

[22] Filed: Feb. 10, 1983

[30] Foreign Application Priority Data

Mar. 31, 1982 [CA] Canada .................................. 400321

[51] Int. Cl.³ .............................................. B29D 27/04
[52] U.S. Cl. .................................... 264/41; 210/500.2; 264/269; 264/331.12; 264/331.19; 427/230; 427/246
[58] Field of Search ...................... 264/41, 269, 331.12, 264/331.19; 427/246, 369, 244; 210/500.2

[56] References Cited

U.S. PATENT DOCUMENTS

| | | | |
|---|---|---|---|
| 3,676,193 | 7/1972 | Cooper et al. | 264/41 X |
| 3,904,788 | 9/1975 | Blaha | 264/41 X |
| 3,929,945 | 12/1975 | Thayer et al. | 264/41 |
| 3,930,105 | 12/1975 | Christen et al. | 264/41 X |
| 3,983,194 | 9/1976 | Richardson et al. | 264/41 |
| 4,061,821 | 12/1977 | Hayano et al. | 264/41 X |
| 4,177,031 | 12/1979 | Thayer et al. | 264/41 X |
| 4,346,126 | 8/1982 | Kutowy et al. | 427/246 X |

Primary Examiner—Philip Anderson
Attorney, Agent, or Firm—Francis W. Lemon

[57] ABSTRACT

A gelation shrinkable, polymer casting solution, that has been cast on the internal surface of a tubular support is gelled using pressure gelation by supporting the tubular support with one end higher than the other and pumping gelation liquid upwardly along the tube at a velocity in the range of the order of 10 to 100 cm/second and at a pressure of at least 10 kPa gauge at all points of contact between the gelation liquid and polymer casting solution. This achieves asymmetricity of the pore structure and ensures that the cast polymer solution is continuously in contact with the tubular support as a gelled membrane. If the tubular support is a porous, tubular support, then preferably the pressure gelation is continued until gelation liquid has passed through the cast polymer solution and the porous support removing solvent and any additives from the cast polymer solution.

6 Claims, 1 Drawing Figure

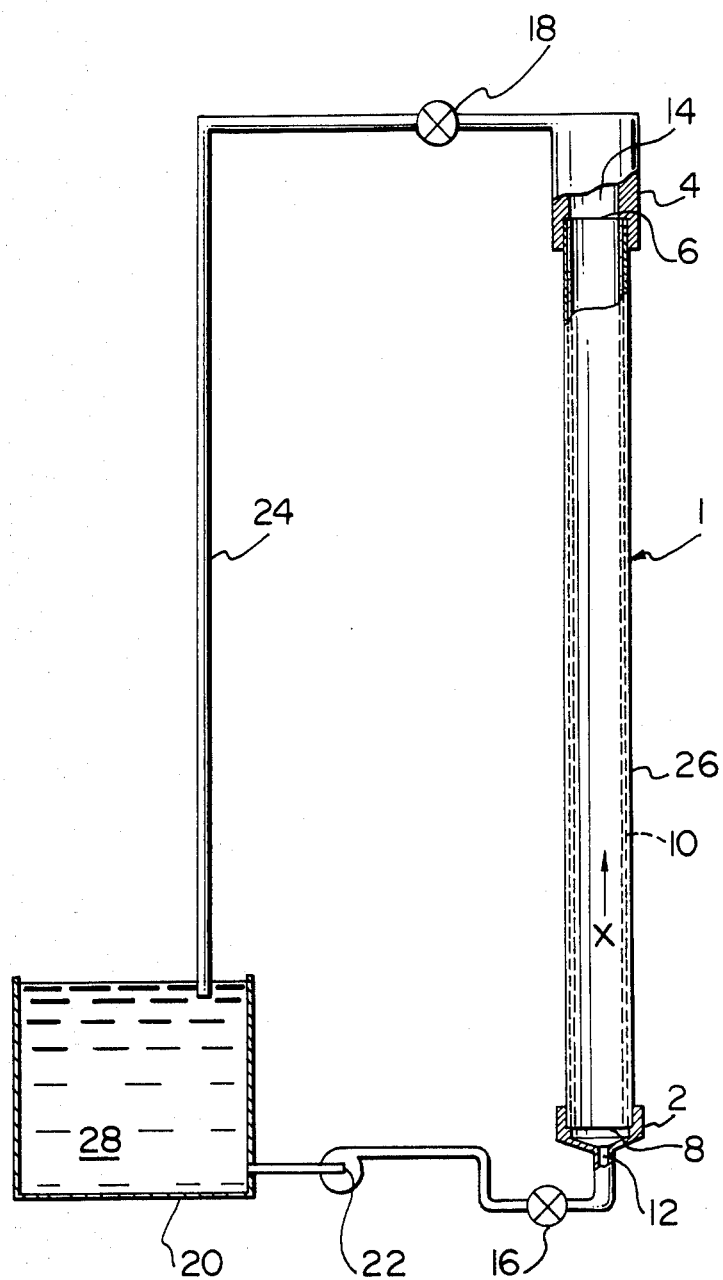

METHOD OF GELLING A GELATION SHRINKABLE, POLYMER CASTING SOLUTION

This invention relates to a method of gelling a gelation shrinkable, polymer casting solution cast on the internal surface of a tubular support.

U.S. Pat. No. 3,929,945, dated Dec. 30, 1975, "Method for Making Tubular Polymeric Membranes for Reverse Osmosis" by W. Thayer, L. Pageau and S. Sourirajan, describes a method of making tubular, polymeric membranes for reverse osmosis wherein a leading bob and a casting bob suspended therefrom are used to cast tubular, polymeric membranes along the bore of an upwardly extending casting tube while a gelation medium is circulated inside the cast membrane and preferably air is circulated along the inside of the freshly cast membrane, above the gelation medium. The leading bob has a cylindrical casing depending therefrom which sits on and seals to the casting bob. The cylindrical casing is initially filled with casting solution and during casting it is raised to be spaced from the casting bob to release the casting solution so that casting solution flows down around the casting bob as it is cast into the tubular, polymeric membrane. Thus, the leading bob, cylindrical casing and the casting bob form a means for storing casting solution prior to casting the tubular, polymeric membrane.

U.S. Pat. No. 4,177,031, dated Dec. 4, 1979, "Apparatus for Casting Tubular Polymeric Membranes for Reverse Osmosis and Ultrafiltration" by W. Thayer, L. Pageau and S. Sourirajan, describes an apparatus for casting tubular, polymeric membranes for reverse osmosis and ultrafiltration which includes a plurality of upwardly extending casting tubes, a manifold with branch outlets for mounting the casting tubes to extend upwardly therefrom, a casting bob assembly comprising a centering sleeve with a screw threaded bore and cylindrical extension, a casting bob screwed into the centering sleeve and having casting solution outlet ports to an annular gap between the casting bob and the casting sleeve, the annular gap being adjustable by screwing the casting bob into and out of the centering sleeve, and a transport sleeve which is pressed on to the casting bob and the cylindrical extension of the centering sleeve for transporting the assembly from one casting tube to another between casting operations and a flexible sleeve and a hose clamp for releasably securing the transport sleeve in a lower end of each casting and sealing the lower ends of each casting tube to a branch outlet.

The method described in U.S. Pat. No. 3,929,945, and the apparatus described in U.S. Pat. No. 4,177,031, have been shown to be very useful for casting tubular, polymeric membranes from casting solutions which previously could not be used. However, a problem still exists with gelation shrinkable, polymer casting solutions in that pockets form between the casting solution, cast on the inside surfaces of upper portions of tubular supports, during gelation, which result in:

(i) upper portions of the tubular support carrying the membrane being unusable; and (ii) the formation of two skins, one on each side of the casting solution, with small pores which results in the loss of asymmetricity of the pores when viewing the membrane in cross-section.

There is a need for a process for the gelation of gelation shrinkable, polymer casting solutions which avoids the formation of pockets between the casting solution, cast on upper portions of the internal surface of tubular supports, during gelation.

According to the present invention, there is provided a method of gelling a gelation shrinkable, polymer casting solution that has been cast on the internal surface of a tubular support comprising:

(a) supporting the tubular support with the gelation shrinkable, polymer casting solution cast on the internal suface thereof and the outer surface thereof exposed to atmosphere, and (b) pumping gelation liquid along the tubular support from the lower end thereof at a velocity in the range of the order of 10 to 100 cm/sec and at a pressure of at least 10 kPa g., to cause pressure gelation of the cast polymer solution at all points of contact between the gelation liquid and the cast polymer solution, the gelation liquid being pumped along the tubular support at least until substantially all of the polymer of the casting solution is gelled to form a semipermeable membrane, whereby (c) formation of pockets between the case polymer solution therein and the tubular support is avoided, and (d) asymmetricity of the pore structure of the membrane, when viewing the membrane in cross-section, is achieved by gelling the cast polymer solution solely outwardly from the inner surface thereof, and (e) the cast polymer solution is continuously in contact with the tubular support as a gelled membrane along the whole length of the tubular support.

In some embodiments of the present invention, the polymer of the cast polymer solution is polymer a substance and a water miscible solvent therefor, and the polymer substance is selected from the group consisting of polysulfones, polyvinylchlorides, aromatic polyamides, aromatic polyimides, polyhydrazides, polybenzoimidazoles, and copolymers thereof.

The cast polymer solution may be a solution of polysulfone in N-methyl pyrrolidinone.

The cast polymer solution may be a solution of polyvinylchloride in tetrahydrofurane.

The cast polymer solution may be an aromatic polyamide in dimethylacetamide (DMA).

Suitable materials for non-porous, tubular supports are glass or a metal such as stainless steel.

Preferably, the tubular support is a porous, tubular support, and the pressure gelation is continued until gelation liquid has passed through the cast polymer solution and the porous support removing solvent and any additives from the cast polymer solution.

Typical materials for the porous, tubular support are porous polyethylene or porous polyvinylchloride.

The porous, tubular support may be spun, bonded porous cloth or paper.

The pressure of at least 10 kPa g. at all points of contact between the gelation liquid and the cast polymer solution may be achieved by using a pressure control valve in an overflow pipe sealed to the top of the tubular support.

In different embodiments of the present invention, the pressure of at least 10 kPa g. at all points of contact between the gelation liquid and the cast polymer solution may be achieved by maintaining at least a head of 10 kPa g. of the gelation liquid above the tubular support.

In the accompanying drawing which illustrates by way of example, an embodiment of the present invention, there is shown a partly sectioned, diagrammatic side view of an apparatus for gelling a gelation shrinkable, polymer casting solution cast on the internal surface of a porous, tubular support.

Referring now to the drawing, there is shown a porous, tubular support 1 supported between end sockets 2 and 4 with one end 6 higher than the other end 8. The porous, tubular support 1 has a gelation shrinkable, polymer casting solution 10 that has been cast on the internal surface thereof by a known method such as, for example, the methods disclosed in U.S. Pat. Nos. 3,929,945 and 4,177,031.

The porous, tubular support 1 is sealed in a liquid-tight manner to the end sockets 2 and 4 which have bores 12 and 14, respectively, leading to valves 16 and 18, respectively. The valve 16 is connected to a gelation bath 20 via a pump 22 and the valve 18 is connected by a pipe 24.

In operation, the apparatus is assembled as shown in the drawing, with the porous, tubular support 1 supported with the one end 6 higher than the other end 8, and the outer surface 26 thereof exposed to atmosphere to avoid the formation of air pockets between the cast polymer solution 10 therein and the porous, tubular support 1.

Pressure gelation of the cast polymer solution 10 is then caused by pumping gelation liquid 28, from the gelation bath 20 by means of the pump 22, upwardly in the direction of arrow X along the porous, tubular support 1. The gelation liquid is pumped upwardly along the porous, tubular support 1 from the lower end thereof at a velocity of the order the 10 to 100 cm/second and at a pressure of at least 10 kPa g. at all points of contact between the gelation liquid and the cast polymer solution 10, whereby:

(i) asymmetricity of the pore structure of the membrane, when viewing the membrane in cross-section, is achieved by avoiding the formation of two skins, one on each side of the cast polymer solution 10, and (ii) the cast solution 10 is coherently united to the porous, tubular support as a gelled membrane along the whole length of the porous, tubular support 1.

The following tests were carried out to verify the present invention.

GELATION SHRINKABLE CASTING SOLUTION COMPOSITIONS USED

| Constituents | | Wt % of Casting Solution | |
|---|---|---|---|
| Generic Name | Type | Range | In Most Tests |
| Polysulfone as the polymer | Udel 3500* / Vitrex** | 15 to 33 | 28 |
| Additive | Polyvinyl pyrrolidone 10K (PVP 10K) | 0 to 12 | 5.6 |
| Solvent | N—methyl pyrrolidone (NMP) | remainder | 66.4 |

*Registered trademark of Union Carbide, Danbury, Conn., U.S.A.
**Registered trademark of Imperial Chemical Industries, London, England First, Conventional Gelation Method Used The casting solution was cast on to the inner surface of the porous, tubular support while the porous, tubular support was being lowered into water gelation bath to gel the cast solution progressively as it was being cast.

Results

Visual inspection revealed blisters in the form of air or liquid pockets between the gelled membrane and the porous, tubular support along the length of the porous, tubular support, thus making them unusable and not capable of being tested.

Second, Conventional Gelation Method Used

To avoid the presence of air during gelation porous, tubular supports, with the casting solutions cast along their bores, were connected in an upright position to a source of gelation liquid. The casting solution was then gelled by pumping the gelation liquid up the bore of the porous, tubular support and allowing it to overflow therefrom until the cast solution was gelled.

Results

In all cases, an upper portion of the gelled membrane was unusable and unacceptable for testing because severe air blistering of the gelled membrane away from porous, tubular support has occurred. The actual length of gelled membrane over which the severe blistering had occurred depended upon the particular casting solution composition used. This severe blistering made it impossible to mount and seal the ends of these gelled membrane, porous tubular support assemblies for testing in conventional module casings. It was noted that, while lower portions of the gelled membranes, usually at least about 0.9 m from the upper end of the porous, tubular support, visually appeared to be blister-free, they showed poor separation results when compared with flat membranes produced from the same compositions and in a conventional manner.

Pressure Gelation Method Described Above with Reference to the Drawing

Using this method produced gelled membranes which were blister free and were coherently united to the porous, tubular support along the whole length of the porous, tubular support, and could be tested for water permeation in conventional module casings.

Results

The following table gives the water permeation and separation % of 40 gm of polyethylene glycol 6000 added to 180 liters of water.

The results given in the table clearly show that asymmetricity of the pore structure of the membrane existed, when viewing the membrane in cross-section.

It should be noted that with seam sealed porous, tubular supports, the pressure gelation according to the present invention has an additional advantage in that it also tests the integrity of the seam.

| Test | Casting Solution Constituents | Liquid to be filtered Temp °C. | Average Pressure on Inner Membrane Surface | Permeation before and after the addition of polyethylene glycol 6000 cc/min Before | After | Separation % |
| --- | --- | --- | --- | --- | --- | --- |
| 1 to 3 | 33 wt % Victrex P200 in solvent + 7 wt % PVP 10K | 30 | 1.9 Kg/cm$^2$ | 320 | 295 | 96.54 |
| 4 | 33 wt % Victrex P200 in solvent + 7 wt % PVP 10K | 30 | 1.9 Kg/cm$^2$ | 215 | 200 | 88.46 |
| 5 to 7 | 32.9 wt % Victrex P200 61.6 wt % NMP 6% PVP 10K | 30 | 1.9 Kg/cm$^2$ | 280 | 260 | 96.15 |

We claim:

1. A method of gelling a gelation shrinkable, polymer casting solution that has been cast on the internal surface of a tubular support, comprising:

(a) supporting the tubular support with the gelation shrinkable, polymer casting solution cast on the internal surface thereof and the outer surface thereof exposed to atmosphere, and (b) pumping gelation liquid along the interior of the tubular support from the lower end thereof at a velocity in the range of the order of 10 to 100 cm/sec, and at a pressure of at least kPs gauge, to cause pressure gelation of the cast polymer solution at all points of contact between the gelation liquid and the cast polymer solution, the gelation liquid being pumped along the tubular support at least until substantially all of the polymer of the casting solution is gelled to form a semipermeable membrane, whereby the formation of pockets between the cast polymer solution therein and the tubular support is avoided, and the asymmetricity of the pore structure of the membrane, when viewing the membrane cross-section, is achieved by gelling the cast polymer solution outwardly from the inner surface thereof, and the cast polymer solution is continuously in contact with the tubular support as a gelled membrane along the whole length of the tubular support.

2. A method according to claim 1 wherein the polymer solution is polymer substance and a water miscible solvent therefor, and the substance is selected from the group consisting of polysulfones, polyvinylchlorides, aromatic polyamides, aromatic polyamides, polyhydrazides, polybenzoimidazoles, and copolymers thereof.

3. A method according to claim 2 wherein the cast polymer solution is a solution of polysulfone in N-methyl pyrrolidinone.

4. A method according to claim 1 wherein the cast polymer solution is a solution of polyvinylchloride in tetrahydrafurane.

5. A method according to claim 1 wherein the cast polymer solution is an aromatic polyamide in dimethylacetamide.

6. A method according to claim 1 wherein the tubular support is a porous, tubular support, and the pressure gelation is continued until gelation liquid has passed through the cast polymer solution and the porous support removing solvent and any additives from the cast polymer solution.

* * * * *

UNITED STATES PATENT AND TRADEMARK OFFICE
CERTIFICATE OF CORRECTION

PATENT NO. : 4,496,502

DATED : 29 January 1985

INVENTOR(S) : Oleh Kutowy et al.

It is certified that error appears in the above-identified patent and that said Letters Patent are hereby corrected as shown below:

Claim 1, Column 5, Line 32 should read:

--of at least 10 kPa gauge,--

Signed and Sealed this

Twenty-seventh Day of December, 1988

Attest:

DONALD J. QUIGG

Attesting Officer      Commissioner of Patents and Trademarks